INVENTOR.
MILTON D. RUBIN

United States Patent Office 3,041,602
Patented June 26, 1962

3,041,602
AUTOMATIC RANGE TRACKING
Milton D. Rubin, Newton, Mass., assignor to the United States of America as represented by the Secretary of the Air Force
Filed May 19, 1958, Ser. No. 736,415
5 Claims. (Cl. 343—7.3)

This invention relates to a system for automatic radar tracking and more particularly to a system for Doppler radar range tracking utilizing a Doppler radar return pulse that is position modulated and then phase compared to a reference thus deriving an error signal operating to provide automatic correction.

In a conventional automatic range-tracking loop in a non-Doppler radar, the error detector employs two adjacent gate voltages, the so-called early and late gates. When these gates are centered on the received video pulse, equal-amplitude signals are delivered through both gates, so that the difference pulse voltage is zero. When the pulse is not split equally between the two gates, the difference signal from the gating circuit is approximately proportional to the error in range, and the polarity is that of the direction of the error. This error voltage is fed into a function unit conventionally utilized in automatic range tracking systems such as shown and described in Radiation Laboratory Series, vol. 20, pages 275–303, published in 1949 by McGraw-Hill Co., Inc.

The output of the function unit is fed to a phantastron or similar time-delay generator, which produces an output pulse delayed with respect to the synchronization trigger by an amount proportional to the voltage output of the function unit. This pulse then operates the early-late gate generator. Thus, any error signal is operated on by the function unit, and continuously resets the gates toward the position of zero error. The early-late gate error detector in the foregoing non-Doppler radar operates directly on the video pulses, and provides no discrimination against fixed targets.

In a Doppler system as utilized in the present invention, moving targets must be tracked through heavy ground clutter as well as through regions with no ground clutter. This means that the range tracker must respond only to signal returns with a Doppler frequency shift in the R.F. carrier. With a coherent oscillator or its echo-box equivalent, the video output presented to the tracker consists of video pulses amplitude-modulated at the Doppler frequency.

In accordance with the present invention, a single gate is time-modulated (jittered) at some frequency well above the natural frequency of the tracking loop, and below the lowest Doppler frequency of interest. Since 60 cycles meets this condition and is readily available, this frequency has been selected, and is also utilized as the reference signal. The pulse output of the gate is thus amplitude-modulated at 60 cycles. The pulse output of the gate has a 60-cycle amplitude modulation superimposed upon the Doppler amplitude modulation. In this case, the signal is presented first to a gated pulse stretcher then a single band-pass filter. The output of the filter is at Doppler frequency. This is then detected to remove the Doppler frequency thus detecting the 60-cycle component. The resulting 60-cycle signal is fed into a full wave phase-sensitive detector. The 60-cycle signal will be in the same phase as the reference signal, or in the opposite phase, depending on whether the gate is, respectively, in the early part or late part of the received pulse. A voltage will then be delivered from the phase-sensitive detector, with the sign of the error and its magnitude proportional to the error. The error signal is then utilized to reset the gate.

By utilizing a full-wave, phase-sensitive detector, the effect of even harmonics is essentially cancelled without the use of tuned filters, thus eliminating systematic range error due to the harmonics to which a half-wave, phase-sensitive detector is prone. Furthermore, the desired error output signal from the full-wave, phase-sensitive detector is larger than that from a similar half-wave detector; and also, because sampling occurs in every half-cycle rather than alternate half-cycles, tracking is more accurate.

It is an object of the present invention to provide a "jittered" range-gate system for radar range tracking.

It is another object of the present invention to provide a "jittered" range-gate system of Doppler radar automatic range tracking utilizing phase comparison.

It is still another object of the present invention to provide a "jittered" range-gate system for Doppler radar automatic range tracking utilizing a full-wave, phase-sensitive detector.

The foregoing, together with other features of the present invention, will be more readily understood after reading the following description in conjunction with the accompanying drawings which depict one practical embodiment of said invention by way of example.

Figure 1:
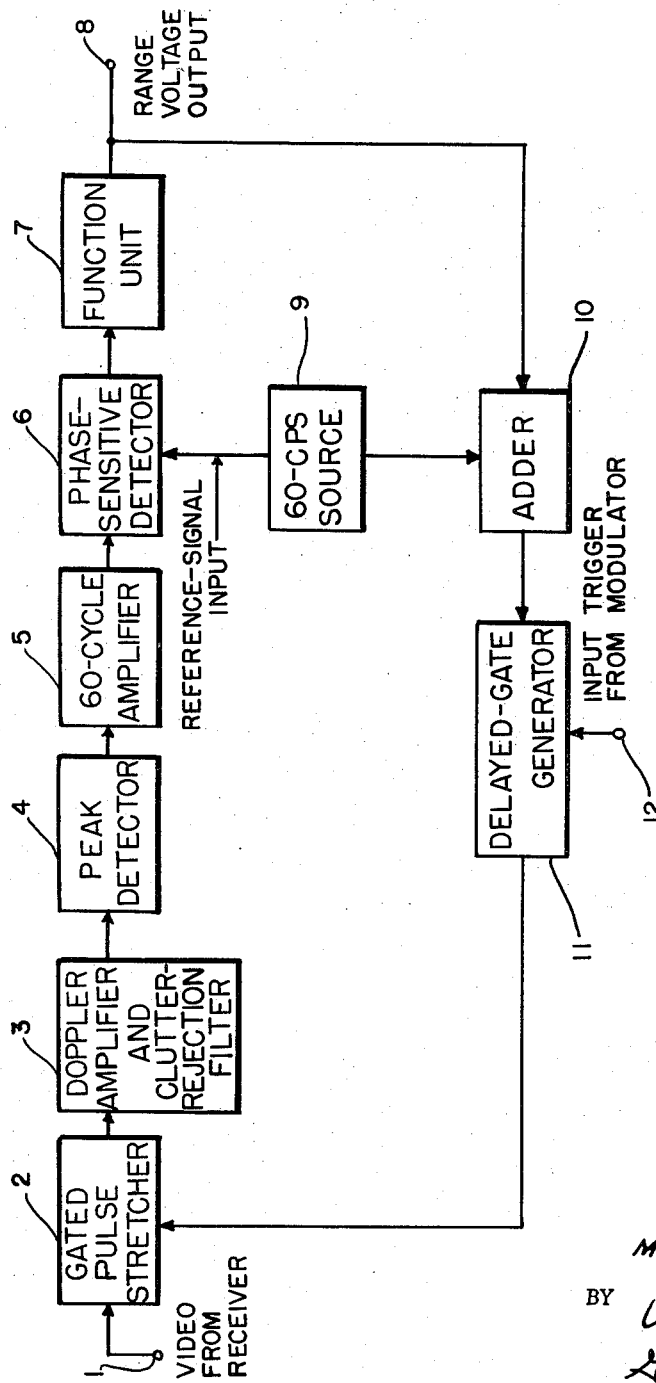
FIGURE 1 shows a block diagram of jittered-gate (pulse position-modulated gate) automatic tracker incorporated in a Doppler radar system.

Referring first to FIGURE 1, a train of echo-signal video pulses, amplitude modulated at the Doppler frequency is delivered at the output of the receiver included in the Doppler radar system. This signal output is fed to terminal 1 of gated pulse stretcher 2. 60 c.p.s. source 9 feeds a signal to adder 10. From adder 10, the 60 c.p.s. signal is fed to delayed-gate generator 11. Delayed-gate generator 11 also receives from terminal 12 an input trigger from the modulator of its radar system. The gate is position-modulated at a 60 c.p.s. rate. The gate output is then fed from delayed-gate generator 11 to gated pulse stretcher 2. The video pulses thus become amplitude-modulated at this rate as well as at the Doppler rate.

Figure 2:
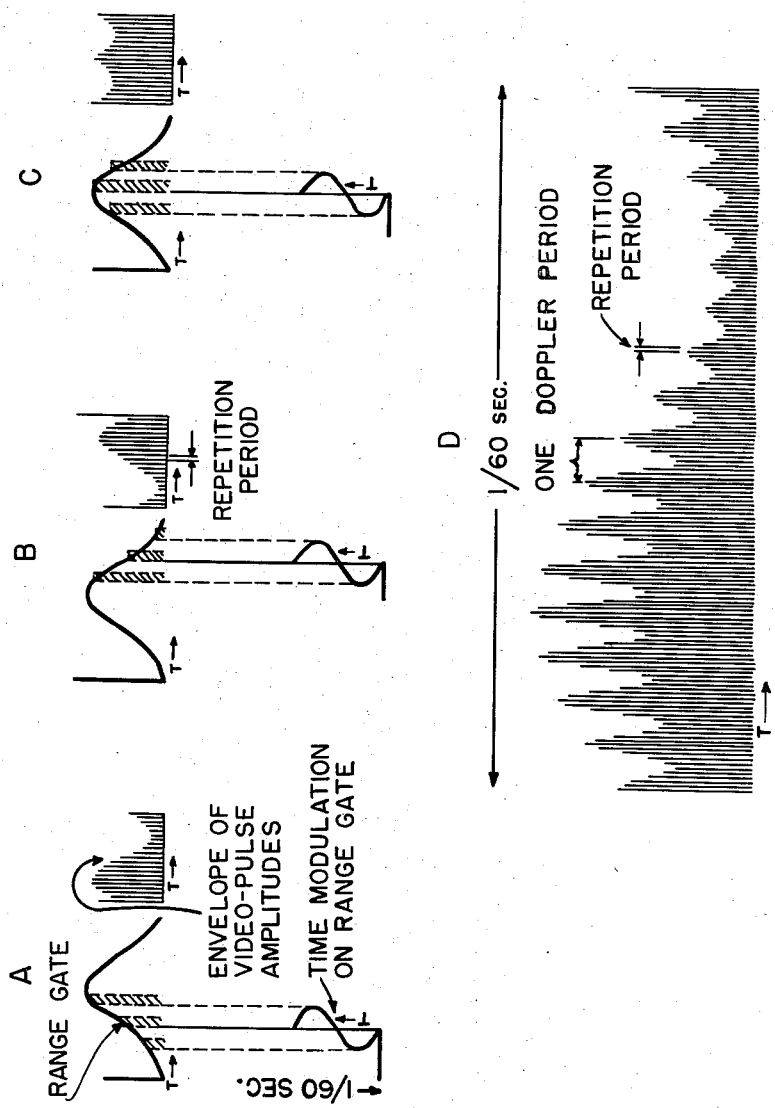
FIGURE 2 shows a chart depicting the basis of operation of said automatic range tracker; and the waveforms illustrating the principle of a jittered gate.

The 60 c.p.s. modulation is shown in FIGS. 2(a), (b) and (c) without the Doppler modulation for clarity. The example shown in FIG. 2(a), with the Doppler modulation, is reproduced in FIG. 2(d).

The video pulses derived from the radar receiver and illustrated as the broad pulse in FIGURES 2(a), 2(b), and 2(c) are fed into pulse-stretcher 2. Simultaneously pulse-stretcher 2 receives position-modulated pulses, serving as gates from delayed-gate generator 11. The aforesaid gates are shown as the narrow pulse in FIGURES 2(a), 2(b), and 2(c). The lowest Doppler sideband is passed through the clutter-rejection filter, and the 60 c.p.s. amplitude-modulation on it is detected by peak detector 4 which is then presented to full wave phase-sensitive detector 6. Phase-sensitive detector 6 simultaneously receives a 60 c.p.s. reference signal from 60 c.p.s. signal source 9. As shown in FIG. 2(a), if the gate is to the left of the video pulse, the 60 c.p.s. modulation on the Doppler is in phase with the reference, if the gate is to the right as shown in FIG. 2(b), the 60 c.p.s. modulation is 180° out of phase with the reference. If the gate is centered, as shown in FIG. 2(c), there is no 60 c.p.s. output from phase-sensitive detector 6, but there are even harmonics. By the use of full-wave, phase-sensitive detector 6, the effect of even harmonics is essentially cancelled without the use of tuned filters, thus eliminating range error due to the harmonics to which a half-wave, phase-sensitive detector is prone. Furthermore, the desired error output signal from phase-sensitive detector 6 is larger than that from a similar half-wave detector; and also, because sampling occurs in every half-cycle rather than alternate half-cycles, tracking is more accurate.

The signal output from phase-sensitive detector 6 is fed to function unit 7. Function unit 7 is conventionally utilized in range tracking systems and is of the double integrator type such as shown and described in Radiation Laboratory Series, vol. 20, pages 282–291, published in 1949 by McGraw-Hill Co., Inc. Essentially function unit 7 output signal is the range voltage which is the double integral of the signal output from phase detector 6. Function unit 7 then furnishes at terminal 8 the range voltage output. The function unit also feeds back the signal from its output to adder 10. This output signal from function unit 7 is added in adder 10 with the 60 c.p.s. modulation signal from source 9. It is then fed to delayed gate generator 11, which produces an output pulse delayed with respect to synchronization trigger received at terminal 12 by an amount proportional to the voltage output of function unit 7. This pulse then is fed to gated-pulse stretcher 2. Thus any error signal is operated on by the function unit, and continuously resets the gates toward the position of zero error.

Although in accordance with the provisions of the patent statutes this invention is described as embodied in concrete form and the principle thereof has been described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What is claimed is:

1. A position-modulated range gate system for automatic range tracking of a target being scanned by a Doppler radar, said target returning a train of amplitude-modulated signals to the radar receiver thereby providing at said receiver output a train of amplitude-modulated video pulses at the Doppler rate, means to generate a reference voltage having a preselected frequency other than said Doppler rate, means to generate pulses, said generated pulses being positioned in time in accordance with the frequency of said reference voltage, means to gate said train of video pulses in accordance with said time positioned pulses, means to peak detect said gated video pulses, and a full wave phase sensitive detector to compare said detected signal to said reference voltage.

2. A position-modulated range gate system for automatic range tracking of a target being scanned by a Doppler radar, said target returning a train of amplitude modulated signals to the radar receiver thereby providing at said receiver output a train of amplitude modulated video pulses at the Doppler rate, means to generate a reference voltage having a preselected frequency other than said Doppler rate, means to generate gating pulses, said generated pulses being positioned in time in accordance with the frequency of said reference voltage, means to gate said train of video pulses in accordance with said generated pulses, filter means to reject the clutter from said gated video pulses, peak detecting means adapted to receive the output of said filter means and operating to produce a signal representative of said preselected frequency of said reference voltage impressed upon said filtered video pulses, a full wave phase sensitive detector to compare said detected signal to said reference voltage, and means to correct said pulse generating means by utilizing the output signal from said phase comparison detector.

3. A position-modulated range gate system for automatic range tracking of a target being scanned by a Doppler radar, said target returning a train of amplitude modulated signals to the radar receiver thereby providing at said receiver output a train of amplitude modulated video pulses at the Doppler rate, means to generate an alternating current reference voltage having a preselected frequency other than said Doppler rate, a delayed-gate generator receiving said reference voltage and operating to produce an output pulse delayed with respect to a synchronization trigger from said Doppler radar, said trigger being applied to said delayed-gate generator, a gated-pulse stretcher receiving said video pulses from said radar receiver, said pulse stretcher being controlled by the pulse output from said delayed-gate generator, means to detect the amplitude-modulation impressed upon said video pulses resulting from said gating of said pulse stretcher, a full wave phase sensitive detector to compare said detected signal to said reference voltage, and correction means controlled by the output signal from said phase comparison detector operating upon said delayed-gate generator.

4. A position-modulated range gate system for automatic range tracking of a target being scanned by a Doppler radar, said target returning a train of modulated signals to the radar receiver thereby providing at said receiver output a train of amplitude modulated video pulses at the Doppler rate, means to generate an alternating current reference voltage having a preselected frequency other than said Doppler rate, an adder to add said reference voltage, a delayed-gate generator receiving said reference voltage by way of said adder and operating to produce an output pulse delayed with respect to a synchronization trigger from said Doppler radar, said trigger being applied to said delayed-gate generator, a gated-pulse stretcher receiving said video pulses from said radar receiver, said pulse stretcher being controlled by the pulse output from said delayed-gate generator, means to detect the amplitude-modulation impressed upon said video pulses resulting from said gating of said pulse stretcher, a full wave phase sensitive detector to compare said detected signal to said reference voltage, and a function unit receiving the compared signal and providing a signal output representative of the range of said target, said range output signal also being applied as a correction voltage to said adder for adding with said reference voltage.

5. A position-modulated range gate system for automatic range tracking of a target being scanned by a Doppler radar, said target returning a train of amplitude-modulated signals to the radar receiver thereby providing at said receiver output a train of amplitude-modulated video pulses at the Doppler rate, means to generate an alternating current reference voltage having a preselected frequency other than said Doppler rate, means to generate pulses, said generated pulses being time-positioned in accordance with said reference voltage, means to amplitude-modulate said train of video pulses at said preselected frequency, said amplitude-modulating means including a gated pulse stretcher controlled by said generated pulses, means to detect the amplitude modulation impressed upon said train of video pulses, a full wave phase sensitive detector to compare said detected signals to said reference voltage, and a function unit receiving the signal resulting from said comparison and providing a signal output representative of the range of said target, said range output signal also being applied as a correction voltage to said generating positioning means.

References Cited in the file of this patent

UNITED STATES PATENTS

| 2,825,056 | Rust | Feb. 25, 1958 |
| 2,846,676 | Richmond | Aug. 5, 1958 |

FOREIGN PATENTS

| 303,700 | Switzerland | Feb. 16, 1955 |